UNITED STATES PATENT OFFICE 2,460,968

METHOD FOR THE OBTAINMENT OF ALIPHATIC SULFONIC ACIDS AND ESTERS THEREOF

Léonce Bert, Michel Procofieff, and Vsevolod Blinoff, Paris, France, assignors to Societe Anonyme dite: Societe d'Innovations Chimiques dite: Sinnova ou Sadic, Meaux-Beauval, France No Drawing. Application July 20, 1945, Serial No. 606,276. In France September 28, 1943

3 Claims. (Cl. 260—400)

It is well known that certain lower aliphatic acids as well as the chlorides, anhydrides, amides and nitriles thereof can be sulphonated by means of sulphuric acid, oleum, sulphuric chlorhydrine, etc., and converted into sulphonic acids of the type:

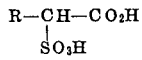

On the contrary, their higher homologues if treated in the same conditions would not give useful products.

According to this invention it has now been found that by submitting aliphatic acids containing at least 6 carbon atoms, or the chlorides, anhydrides, amides or nitriles of such acids, to the action of sulphuric chlorhydrine in the medium of an indifferent solvent and providing for suitable conditions, sulphonic acids of the above mentioned type are obtained. The same reaction applied to the esters R—CH$_2$—CO$_2$—R' of higher aliphatic acids leads to the sulphonic esters

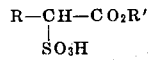

Once the solvent is distilled off the sulphonic acids or esters are obtained in the raw state in the form of syrups which solidify by cooling in certain cases into pasty masses, sometimes into amorphous or crystallized solids.

These sulphonic compounds are soluble in water. They can be bleached by means of the bleaching agents used for fatty acids: hypochlorites, hydrosulphites, hydrogen peroxide, persalts. Their aqueous solutions have frothing and wetting properties; those of the alkaline and earth-alkaline salts of the acids have only a frothing character, while those of the ester salts possess both frothing and wetting properties. The esters or ester salts are more valuable in this respect than the acids and salts thereof. It is to be noted that the sulphonic esters can also be very easily obtained by esterifying the sulphonic acids prepared according to this invention.

The sulphonic acids and their free or salified esters can be used in lime-, magnesia-, salt- or acid-bearing waters. Added to their valuable tensio-active properties, these peculiarities make them suitable for many various industrial or domestic applications where wetting, dispersing, emulsing, equalizing, distributing, solving, is the object aimed at. They can be used as auxiliary products in the treatment of leather and rubber and in particular in the textile industry. They are suitable for washing and cleaning the skin, the hair, linen, domestic utensils, etc.

For such manifold applications they can be used in the solid, powdered or divided state, as a paste or a cream, or as a solution.

*Example 1.*—One molecular weight of caproic, caprylic, pelargonic, capric, lauric, myristic, palmitic or stearic acid is dissolved in 500 cc. of carbon tetrachloride and added with 1,1 molecular weight of sulphuric chlorhydrine. The whole is heated under reflux until the gas evolution has ceased, after which the solvent is distilled off; the distillation residue, which is entirely water-soluble, is the desired raw sulphonic acid.

*Example 2.*—100 parts of the acid mixture yielded by the coco-nut oil are dissolved in 500 cc. of carbon tetrachloride and treated as described in Example 1 by means of 75 parts of sulphuric chlorhydrine.

*Example 3.*—1 molecular weight of ethyl pelargonate is treated as described in Example 1 by means of 1,1 molecular weight of sulphuric chlorhydrine in 500 cc. of carbon tetrachloride. The yield is less satisfactory than by using pelargonic acid.

According to another peculiarity of this invention, by esterifying said monosulphonic fatty acids of the type

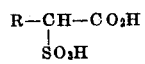

in which R stands for straight or branched alkyl radicals containing at least four carbon atoms, it is possible to obtain not only monosulphonic but also polysulphonic esters the applications of which in industry are particularly advantageous.

Thus, this invention relates more particularly to a method for producing the following esters, as well as to these esters themselves as novel industrial products and to the various industrial applications of the same:

A. *Monoesters*

(a) 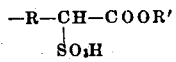

obtained by esterifying by means of saturated or unsaturated aliphatic, arylic, arylaliphatic and alicyclic monoalcohols R'OH.

For that purpose the mixture of acid and alcohol is heated with or without a catalyst to a suitable temperature until the limit of esterfication is reached. It is also possible first to transform the acid

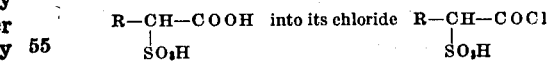

and to add the calculated quantity of alcohol R'OH.

(b)
$$-R-CH-CO_2-(CH_2)_n-OH$$
$$\phantom{-R-}|$$
$$\phantom{-R-}SO_3H$$

obtained by esterifying by means of the simple glycols $OH-(CH_2)_n-OH$, $n$ being any number between 2 and 10, the esterification being effected as under (a).

(c)
$$-R-CH-CO_2(CH_2CH_2O)_nH$$
$$\phantom{-R-}|$$
$$\phantom{-R-}SO_3H$$

obtained by esterifying by means of complex glycols such as di-, tri- or generally polyethyleneglycols, $n$ being any number between 2 and 20 and the esterification being effected as under (a).

(d)
$$-R-CH-CO_2CH_2-CHOH-CH_2OH$$
$$\phantom{-R-}|$$
$$\phantom{-R-}SO_3H$$

or $$R-CH-CO_2-CH(CH_2OH)_2$$
$$\phantom{R-}|$$
$$\phantom{R-}SO_3H$$

obtained by esterifying by means of glycerol, the operation being effected as under (a).

(e)
$$-R-CH-CO_2-(CH_2)_nX$$
$$\phantom{-R-}|$$
$$\phantom{-R-}SO_3H$$

wherein X stands for a halogen and $n$ is any number between 2 and 10, obtained by esterifying by means of a halohydrine $OH(CH_2)_nX$ employed in the same way as the alcohol R'OH under (a).

(f)
$$-R-CH-CO_2-(CH_2CH_2O)_nX$$
$$\phantom{-R-}|$$
$$\phantom{-R-}SO_3H$$

$n$ being any number from 2 to 20, by reacting polyethylene-glycols with halohydrines as under (a).

The esters (e) and (f) can also be obtained by first esterifying the acids $$R-CH-COOH$$
$$|$$
$$SO_3H$$

by means of glycols or polyethylene-glycols as under (b) or (c), then converting the ester bearing an alcohol group formed into the halogen-bearing ester.

(g)
$$-R-CH-CO_2-CH_2CHX-CH_2X$$
$$\phantom{-R-}|$$
$$\phantom{-R-}SO_3H$$

or $$R-CH-CO_2-CH(CH_2X)_2$$
$$\phantom{R-}|$$
$$\phantom{R-}SO_3H$$

obtained by esterifying as under (a) with the dihalohydrines of glycerol $CH_2X-CHX-CH_2OH$ or $CH_2X-CHOH-CH_2X$.

B. Symmetric diesters $$R-CH-CO_2-(CH_2)_n-CO_2-CH-R$$
$$\phantom{R-}|\phantom{-CH-CO_2-(CH_2)_n-CO_2-CH-}|$$
$$\phantom{R-}SO_3H\phantom{-CH-CO_2-(CH_2)_n-CO_2-CH-}SO_3H$$

or $$R-CH-CO_2-(CH_2CH_2O)_n-CO_2-CH-R$$
$$\phantom{R-}|\phantom{-CH-CO_2-(CH_2CH_2O)_n-CO_2-CH-}|$$
$$\phantom{R-}SO_3H\phantom{-CH-CO_2-(CH_2CH_2O)_n-CO_2-CH-}SO_3H$$

obtained as under A (a), by esterifying the monoesters (b) or (c) with the generating acids.

C. Mixed diesters

1. 
$$-R-CH-CO_2-(CH_2)_n-SO_4H$$
$$\phantom{-R-}|$$
$$\phantom{-R-}SO_3H$$

or $$R-CH-CO_2-(CH_2CH_2O)_nSO_4H$$
$$\phantom{R-}|$$
$$\phantom{R-}SO_3H$$

The monoesters (b) or (c) are esterified with concentrated sulphuric acid, oleum or sulphuric chlorhydrine. The diester obtained bears both groups $SO_3H$ and $SO_4H$ which give it the character of a monosulphonic sulphuric ester comparable e. g. to oleic alcohol the hydroxyl group of which was esterified by sulphuric acid at the same time as the double bond retained the elements of the same.

2. 
$$-R-CH-CO_2-(CH_2)_n-CO_2R'$$
$$\phantom{-R-}|$$
$$\phantom{-R-}SO_3H$$

or $$R-CH-CO_2-(CH_2CH_2O)_n-CO_2-R'$$
$$\phantom{R-}|$$
$$\phantom{R-}SO_3H$$

The monoesters (b) or (c) are esterified with an acid R'COOH, its chloride R'COCl or its anhydride $(R'CO)_2O$.

3. 
$$-R-CH-CO_2-(CH_2)_n-CO_2-CH-R'$$
$$\phantom{-R-}|\phantom{-CH-CO_2-(CH_2)_n-CO_2-CH-}|$$
$$\phantom{-R-}SO_3H\phantom{-CH-CO_2-(CH_2)_n-CO_2-CH-}SO_3H$$

or $$R-CH-CO_2-(CH_2-CH_2O)_nCO_2-CH-R'$$
$$\phantom{R-}|\phantom{-CH-CO_2-(CH_2-CH_2O)_nCO_2-CH-}|$$
$$\phantom{R-}SO_3H\phantom{-CH-CO_2-(CH_2-CH_2O)_nCO_2-CH-}SO_3H$$

The monoesters (b) or (c) are esterified with a saturated monosulphonic fatty monoacid bearing a number of carbon atoms different from that of the acid which led to the monoester.

It is to be noted that all the esterifications described are effected by the conventional methods applied to higher sulphonic aliphatic acids which possess the peculiarity that when employed in the anhydrous state, such as they result from the preparation hereinbefore described, they are excellent esterification catalysts, in the same manner e. g. as benzene-sulphonic acid.

A pure acid can be replaced by its mixture with other suitable acids, for instance when esterifying the acid mixture resulting from the saponification of coconut oil. The glycerol reclaimed in this saponification then is advantageously converted into dichlorhydrine by the dry hydrochloric gas which evolves from the sulphonation apparatus during the treatments with sulphuric chlorhydrine and thionyl chloride ($SO_2$ is not objectionable).

Whatever sulphonic ester is obtained is converted into sulphonate by neutralization with metal hydroxides, alkali or like carbonates or bicarbonates, organic bases such as cyclohexylamine, triethanolamine, etc.

In the particular case of tertiary organic bases such as trimethylamine or triethanolamine, one or two additional molecules of the base can also unite with the chloromethylene groups, the nitrogen then passing from tri- to pentavalency. For instance, with the α-sulphonic lauric ester of glycerol dichlorhydrine, two higher molecular compounds are obtained, viz.:

$$CH_3-(CH_2)_7-CH-CO_2-CH \begin{array}{c} Cl \\ | \\ CH_2-N(CH_3)_3 \\ \phantom{x} \\ CH_2-N(CH_3)_3 \\ | \\ Cl \end{array}$$
$$\phantom{CH_3-(CH_2)_7-}SO_3HN(CH_3)_3$$

$$CH_3-(CH_2)_7-CH----CO_2CH \begin{array}{c} Cl \\ | \\ CH_2-N(CH_2CH_2OH)_3 \\ \phantom{x} \\ CH_2-N(CH_2CH_2OH)_3 \end{array}$$
$$SO_3HN(CH_2CH_2OH)_3 \phantom{xx} Cl$$

The esters of the above seventeen types are water-soluble as well as most of their mineral or organic salts. They can be bleached by means of chlorine hypochlorites, hydrosulphites, ozone, hydrogen peroxide, persalts, active charcoals, etc. The bleached or unbleached aqueous solutions of the salified or unsalified esters have frothing and wetting properties; they are not or little affected by the Na-, Ca- or Mg-ions in salted or hard waters and sufficiently resistant to hydrolysis in an acid or a basic medium to allow their use in a great many cases where the remarkable tensioactive properties of some of them do wonderfully well (monoesters of butyl- and isoamyl-alcohols; diester C, 2°; monoesters of halohydrines A, (e) and (f); monoesters of glycerol dihalohydrines).

This is the case in those countless industrial or domestic applications where wetting, dispersing, emulsing, equalizing, distributing, solving, etc., is the result aimed at.

They can be used advantageously as auxiliary products in the leather and rubber industries and above all in the textile industry. They are suitable for cleaning the epiderm and skin excrescences, domestic utensils, etc.

For such manifold uses they can be employed in the solid form (powder or lumps) as pastes or creams, in solution.

*Example 1.*—One molecular weight of caproic, caprylic, pelargonic, capric, lauric, myristic, palmitic or stearic acid is monosulphonated as hereinbefore described. The esterifica is effected directly by one of the conventional methods up to the limit of esterification with any one of the methylic, ethylic, propylic, isopropylic, butylic, isobutylic, isoamylic, benzylic, phenylethylic, cinnamic alcohols, with cyclohexanol, glycol, diethylene-glycol or monochlorhydrines thereof; with glycerol or its raw dichlorhydrine, etc.

*Example 2.*—One molecular weight of any one of the monoacids mentioned in the Example 1 is dissolved in 500 cc. of carbon tetrachloride. The solution is heated under reflux with 1,1 molecular weight of sulphuric chlorhydrine until the gas evolution has ceased. One molecular weight of thionyl-chloride is then added and heating is continued until the additional evolution of gas has ceased. Finally, one molecular weight of one of the alcohols mentioned is added and the operation is stopped when hydrochloric gas is no longer evolved. The solvent is distilled off. The residue, which is entirely water-soluble, is the raw monoester desired.

*Example 3.*—One molecular weight of a monoester obtained from a saturated monosulphonic fatty acid and glycol or diethylene-glycol (Examples 1 and 2) is converted into the symmetric diester with the same acid, the monoester in that case having the action of glycol or diethylene-glycol.

*Example 4.*—One molecular weight of the monosulphonic monoester of the fatty acids mentioned in Example 1 with glycol or diethylene-glycol, prepared as described in Example 2, is treated at less than 30° C., while stirring, with 1 molecular weight of sulphuric chlorhydrine until the hydrochloric gas evolution has ceased.

*Example 5.*—One molecular weight of a monoester obtained with glycol or diethylene-glycol as described under 1 or 2 is esterified with crystallizable acetic acid, acetyl-chloride or acetic anhydride.

*Example 6.*—One molecular weight of glycolic or diethylene-glycolic monoester obtained as described under 1 or 2 is esterified with another saturated monosulphonic fatty acid (or its chloride) than the generating sulphonic acid.

In the six examples mentioned the glycol or diethylene-glycol specified may be replaced mutatis mutandis by one of the glycols formulated $OH(CH_2)_nOH$ wherein $n$ stands for any number from 3 to 10 or by one of the polyethylene-glycols. Moreover, those saturated aliphatic acids $C_nH_{2n}O_2$ in which $n=6$ to 18 may be used as mixtures.

What we claim as our invention and desire to secure by Letters Patent is:

1. A method of sulfonating an aliphatic acid containing at least six carbon atoms with chlorosulfonic acid comprising dissolving the acid in a solvent which is indifferent with regard to the sulfonating agent, admixing the said solution to chlorosulfonic acid at a ratio of 1 molecule of the initial substance to about 1.1 molecules of chlorosulfonic acid, sulfonating the mixture and removing the solvent by distillation after the gas evolution has ceased.

2. A method of sulfonating an aliphatic acid containing at least six carbon atoms with chlorosulfonic acid comprising dissolving the acid at a ratio of at least two times its volume in a solvent which is indifferent with regard to the sulfonating agent, admixing the said solution to chlorosulfonic acid at a ratio of 1 molecule of the initial substance to about 1.1 molecules of chlorosulfonic acid, sulfonating the mixture and removing the solvent by distillation after the gas evolution has ceased.

3. A method of sulfonating an aliphatic acid containing at least six carbon atoms with chlorosulfonic acid comprising dissolving the acid at a ratio of three to five times its volume, in a solvent which is indifferent with regard to the sulfonating agent, admixing the said solution to chlorosulfonic acid at a ratio of 1 molecule of the initial substance to about 1.1 molecules of chlorosulfonic acid, sulfonating the mixture and removing the solvent by distillation after the gas evolution has ceased.

LÉONCE BERT.
MICHEL PROCOFIEFF.
VSEVOLOD BLINOFF.

REFERENCES CITED

The following references are of record in the file of this patent:

UNITED STATES PATENTS

| Number | Name | Date |
|---|---|---|
| 1,822,977 | Munz | Sept. 15, 1931 |
| 1,926,442 | Gunther et al. | Sept. 12, 1933 |
| 1,931,806 | Ulrich et al. | Oct. 24, 1933 |
| 1,936,265 | Rheiner et al. | Nov. 21, 1933 |
| 2,043,476 | Gunther et al. | June 9, 1936 |
| 2,044,400 | Rheiner et al. | June 16, 1936 |
| 2,129,896 | Whiteman | Sept. 13, 1938 |
| 2,136,379 | Flett | Nov. 15, 1938 |
| 2,192,721 | Toone | Mar. 15, 1940 |
| 2,371,284 | Cook et al. | Mar. 13, 1945 |